United States Patent [19]
Gilbert

[11] 3,991,453
[45] Nov. 16, 1976

[54] SPINDLE DRIVES FOR MULTI SPINDLE LATHES

[75] Inventor: Harold James Gilbert, Coventry, England

[73] Assignee: Wickman Machine Tool Sales Limited, Coventry, England

[22] Filed: Dec. 2, 1974

[21] Appl. No.: 528,790

[30] Foreign Application Priority Data
Dec. 6, 1973 United Kingdom............... 56566/73

[52] U.S. Cl. ................................. 29/37 R; 29/38 R
[51] Int. Cl.² ........................................ B23P 23/00
[58] Field of Search ................ 408/35; 29/35.5, 36, 29/37; 74/813 R

[56] References Cited
UNITED STATES PATENTS

| | | | |
|---|---|---|---|
| 1,996,368 | 4/1935 | Drissner................................. | 29/37 |
| 2,471,074 | 5/1949 | Miller et al. ........................... | 29/37 |
| 2,825,121 | 3/1958 | Williams................................. | 29/37 |

Primary Examiner—Othell M. Simpson
Assistant Examiner—W. R. Briggs
Attorney, Agent, or Firm—Holman & Stern

[57] ABSTRACT

A spindle drive for an eight spindle lathe comprising a single input gear disposed at the center of the circle of the eight spindles, two gears meshing with the single input gear, each of these two gears engaging with pairs of further gears which are arranged to drive the work spindles.

1 Claim, 3 Drawing Figures

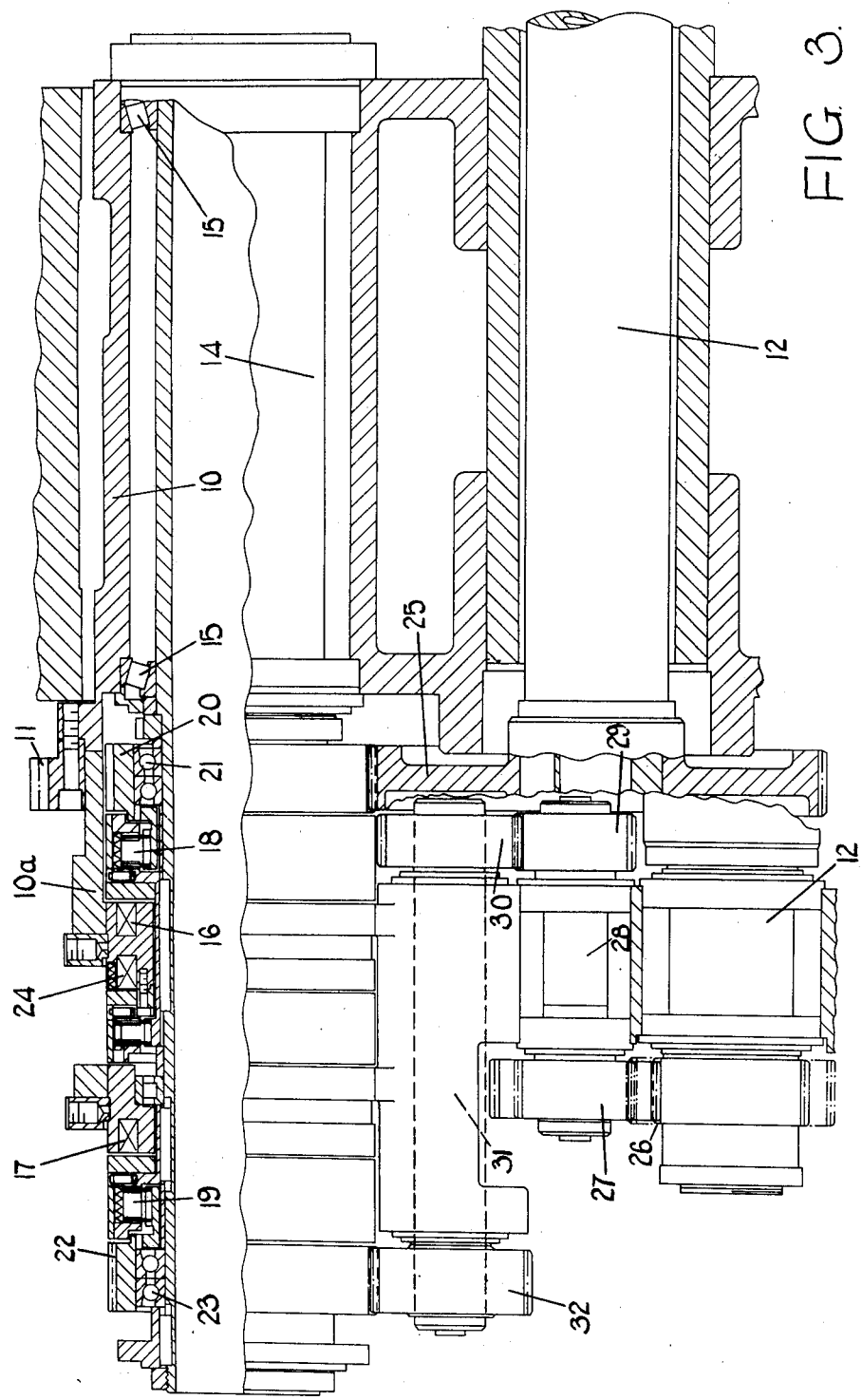

SPINDLE DRIVES FOR MULTI SPINDLE LATHES

FIELD OF THE INVENTION

This invention relates to multi-spindle lathes of the kind in which the work spindles are rotatably mounted, in an indexable spindle drum, about a pitch circle, the spindles being rotatably driven by gearing which permits of speed changes. In particular, the invention relates to said gearing for driving the spindles of an eight spindle machine.

SUMMARY OF AND OBJECTS OF THE INVENTION

It is the object of this invention to provide spindle drives for the spindles in an efficient manner and in which the relatively limited space available for accommodating the gearing is used in the most economical way.

In accordance with the present invention a spindle drive for the work spindles of an eight spindle lathe comprises a single input gear disposed at the centre of a pitch circle on which the spindles are disposed, said single input gear being drivingly engaged with two gears, which in turn are drivingly engaged with respective pairs of further gears, each gear of said pair of further gears being arranged to drive two of said work spindles.

The invention will now be described by way of example with reference to the accompanying drawings in which

BRIEF DESCRIPTION OF THE DRAWINGS

FIG. 3 is an expander cross-sectional view to show the gearing on a larger scale.

DESCRIPTION OF THE PREFERRED EMBODIMENT

Figure 1:
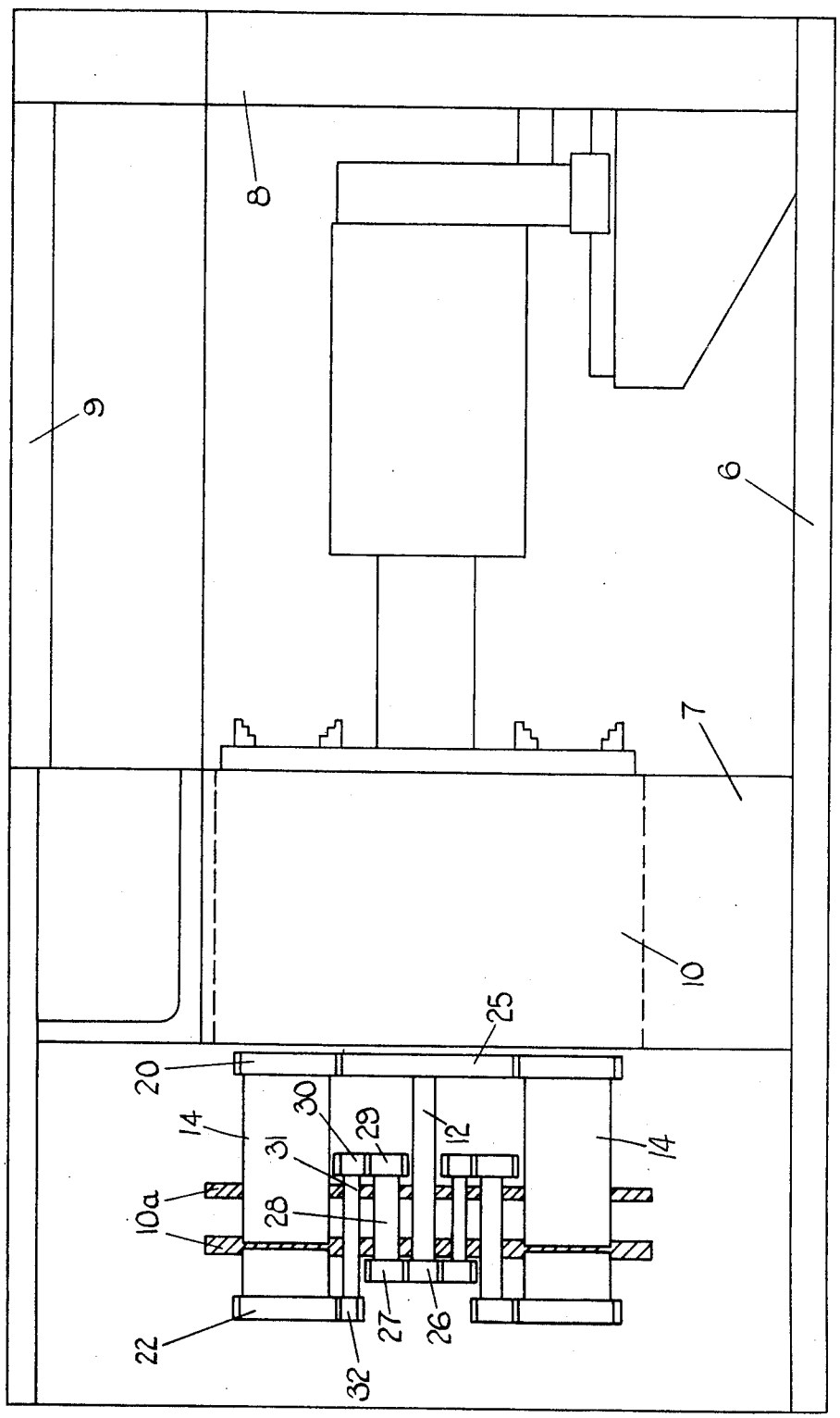
FIG. 1 is a diagrammatic representation of a multi-spindle lathe constructed in accordance with the invention.

The drawings show an automatic eight spindle lathe of the kind including a base 6 on which a pair of spaced superstructures 7, 8 are mounted. These are connected together by a bridge structure 9. In one of the superstructures is rotatably supported an indexable spindle drum 10 having secured to it a rearward extension portion 10a. On the outside of the assembly, which comprises the spindle drum and its extension, is a ring gear 11 which co-operates with mechanism (not illustrated) whereby the drum can be indexed about its central substantially horizontal axis.

Extending coaxially through the drum 10 and its extension 10a, is a main drive spindle 12. This is connected in the other superstructure to gearing (not illustrated) driven by a motor associated with the lathe. The spindle 12 is tubular to provide access for an inner tube (not illustrated) carrying electrical wiring for clutch mechanisms and brake means, to be described.

Figure 2:
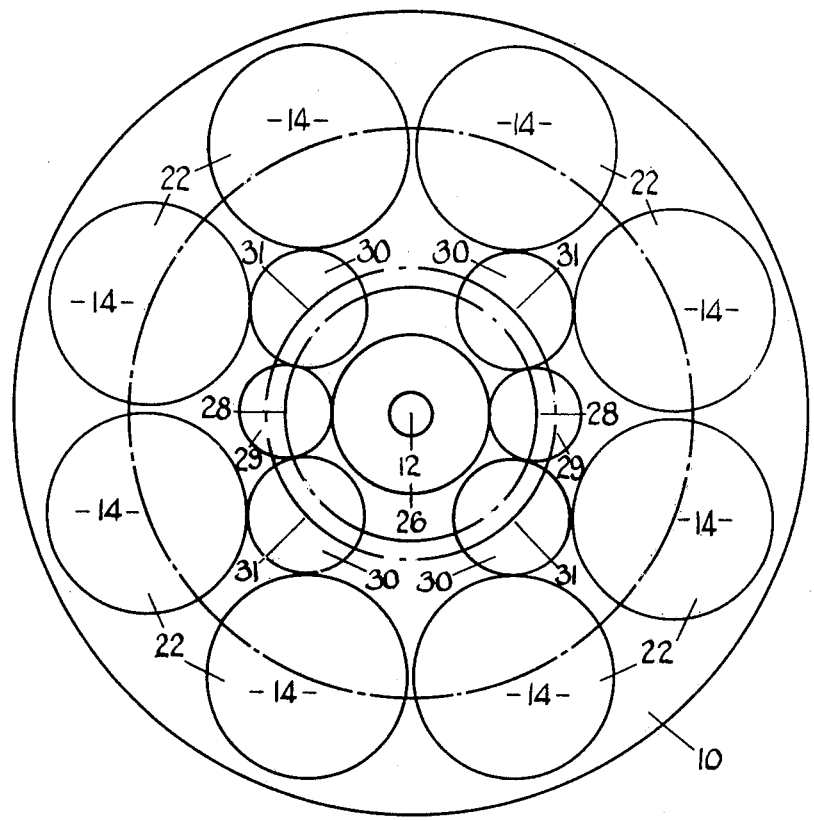
FIG. 2 is a diagrammatic representation of the indexable spindle drum and spindle drive gearing of the lathe.

The main shaft 12 is arranged to drive the eight work spindles 14 of the lathe. One of these work spindles 14 is illustrated in FIG. 3. It is tubular and is mounted in bearings 15 in the spindle drum 10. The work spindles 14 are, as shown in FIG. 2, mounted on a pitch circle, the centre of which coincides with the centre of the drum 10 and of the main drive shaft 12.

To transmit drive between the main shaft 12 and the work spindles 14, there are trains of gears arranged to provide alternative speed ratios. The gearing is arranged to be driven continuously by the main shaft 12 and can drive the work spindles 14 at alternative speed ratios. The speed ratios are, however selected by alternative clutch mechanisms carried on the work spindles 14 respectively. These clutch mechanisms are fully described in Patent Application No. 56565/73. The clutch mechanisms incorporate electro-magnetic coils 16, 17 respectively and sets of clutch plates 18, 19 which are compressed upon energisation of the coils. The clutch plates 18 provide a releasable driving connection between a work spindle 14 and a gear 20 rotatably mounted thereon. The mounting of the gear 20 on the work spindle 14 is through thrust and journal bearings 21.

The clutch plates 19 moreover, provide a releasable driving connection between the work spindle 14 and a further gear 22 mounted on the work spindle through further bearings 23.

On each of the work spindles there is also brake means incorporating a further electro-magnetic coil 24 whereby the work spindle can be locked if necessary in a selected angular position.

Wiring which extends through the tube previously mentioned within the main spindle 12 serves the respective clutch mechanisms and brake means on each one of the eight work spindles 14.

To provide drive between the main shaft 12 and the gear 20 on each one of the work spindles 14, the main shaft carries a large gear 25 permanently meshing with the gears 20 on all the work spindles.

To provide drive between the main shaft 12 and each gear 22 on the eight work spindles 14, the gear train, which is shown in expanded form in FIG. 2, is employed. The main shaft 12, at its extremity, carries a gear 26 meshing with a gear 27 carried on a first intermediate shaft 28, the gears 26 and 27 may however, be changed for meshing gears of different size to provide a different speed ratio. This is indicated in FIG. 3, by the alternative sets of teeth on these two gears 26 and 27.

The gear 27, is mounted at one end of the first intermediate shaft 28 and at its other end, this shaft carries a further gear 29 meshing with a gear 30 on a further intermediate shaft 31. This shaft 31 in turn carries, at its other end, a gear 32 meshing with the gear 22 on one of the spindles 14, gears 22 and 26 are thus disposed in transverse axially spaced planes.

The intermediate shafts 28 and 31 which are of different lengths and are carried in respective sets of bearings in the spindle drum extension 10a.

As can be seen from FIG. 2, there are two first intermediate shafts 28 disposed at diametrically opposite sides of the axis of the main shaft 12. The gear 29 on each of said shafts 28 meshes with a further pair of gears 30 on respective further intermediate shafts 31. There are thus four of said shafts 31. Each shaft 31 drives through its gear 32 a pair of the work spindle gears 22.

With this arrangement, the space available for the gearing for driving mechanisms for the eight work spindles 14 is utilised in the most economical way.

I claim:

1. A spindle drive for work spindles rotatably mounted in a spindle drum (10) of an eight spindle lathe consisting of a main shaft, (12) a single input gear (26) mounted on said main shaft, eight work spindles (14) disposed on a pitch circle, the centre of which coincides with the axis of said main shaft, (12) two gears (27) drivingly engaged with said single gear, (25) two shafts (28) inwardly of said pitch circle on which said two gears (27) are mounted respectively, respective further gears (29) mounted on the two shafts (28) in spaced relationship from said two gears (27) within said pitch circle, respectively, four still further gears (30) meshing with said further gears (29), four further shafts (31) on which said still further gears (30) are mounted respectively, and four yet further gears (32) mounted on said four further shafts in spaced relation from said still further gears, (30) respectively, each of said, last-mentioned yet further gears (32) being drivingly engaged with two respective gears (22) of said work spindles (14), said two shafts (28) and said four further shafts (31) being of different lengths so that said input gear (26) and said two gears (27) are disposed in a transverse plane axially spaced from a transverse plane in which said yet further gears (32) and said two respective gears (22) are disposed.

* * * * *